INVENTOR.
LEE E. JOHNSON
JAMES M. PORTER
BY
ATTORNEY

United States Patent Office 3,626,711
Patented Dec. 14, 1971

3,626,711
CRYSTALLIZATION PREVENTION CONTROL
James M. Porter and Lee E. Johnson, La Crosse, Wis., assignors to The Trane Company, La Crosse, Wis.
Filed Sept. 9, 1969, Ser. No. 856,275
Int. Cl. F25b 15/06
U.S. Cl. 62—141                3 Claims

ABSTRACT OF THE DISCLOSURE

An absorption refrigeration machine wherein the condenser temperature and the temperature of the concentrated solution leaving the generator are sensed to provide a signal or measure of impending crystallization in the solution heat exchanger. When the aforementioned temperatures reach a predetermined maximum a control signal is transmitted to a normally closed valve. The valve opens and dumps refrigerant or other dilute solution into the heat exchanger and associated piping which contains partially crystallized absorbent solution.

BACKGROUND OF THE INVENTION

This invention relates to an absorption refrigeration machine, and more particularly, to a means for preventing and decrystallizing sensitive areas of the absorption machine when a predetermined condition occurs.

During operation of an absorption refrigeration machine, the occurrence of accidents or malfunctions can cause solidification or crystallization of absorption solution in the flow passages of the machine. One of the most common sites for crystallization is in the concentrated solution passage of the heat exchanger. At this point the absorption solution has been concentrated by the generator and is being forced back to the absorber. Between the generator and the absorber the concentrated solution passes through a heat exchanger, releasing heat to dilute absorbent solution being pumped to the generator from the absorber. If for some reason the absorbent solution becomes too concentrated or is cooled below its crystallization temperature, the concentrated solution flow passage begins to block and eventually closes completely. This condition can occur over a period of very few minutes and has been known to occur in less than a minute.

A number of conditions can cause crystallization of the concentrated absorbent solution in the heat exchanger. For example, the presence of air or other inert gas in the absorber will prevent dilution of the absorbent solution therein. This will cause the concentration of the concentrated absorbent solution to rise. As the solution becomes supersaturated, it will begin to crystallize. Also, if the condenser water becomes colder than normal operating temperature, it will reduce the temperature of the dilute absorbent solution leaving the absorber. This in turn will reduce the temperature of the concentrated absorbent solution in the heat exchanger below the crystallization point and begin to block the heat exchanger. Over-firing the generator resulting in supersaturation of the absorbent solution will also cause crystallization blockage of the heat exchanger passages.

It is desirable to prevent any of the above conditions from ever occurring. However, because of malfunction or accident it is impossible to prevent crystallization in the heat exchanger at all times. When crystallization and heat exchanger blockage occurs, the only practical method of clearing the heat exchanger passages has been to heat them by an external heat source and liquify the absorbent solution therein. It is, therefore, most desirable to possess a means for sensing crystallization or impending crystallization and to clear heat exchanger passages before they become so completely blocked that external heat must be applied.

SUMMARY OF THE INVENTION

Therefore, this invention provides an absorption refrigeration machine including an absorber, an evaporator, a condenser, a generator means for producing concentrated solution, first conduit means for conducting concentrated solution from the generator means to the absorber. Second conduit means for conducting dilute solution from the absorber to the generator means, and a heat exchange means for placing the second conduit means in heat exchange relationship with the first conduit means at a point between the generator and the absorber, the heat exchange means having a first flow passage comprising a portion of the first conduit means and a second flow passage comprising a portion of the second conduit means. The heat exchange means positioned below the generator means, the improvement comprising a control means for sensing the difference between a temperature representative of the operating temperature of the condenser and the temperature of concentrated solution leaving the generator means, and for producing a control signal when the difference exceeds a predetermined maximum, anticrystallization means responsive to the control signal for diluting the concentrated solution in the first flow passage by mixing dilute solution in or refrigerant therewith.

DESCRIPTION OF THE PREFERRED EMBODIMENTS

Figure 1:
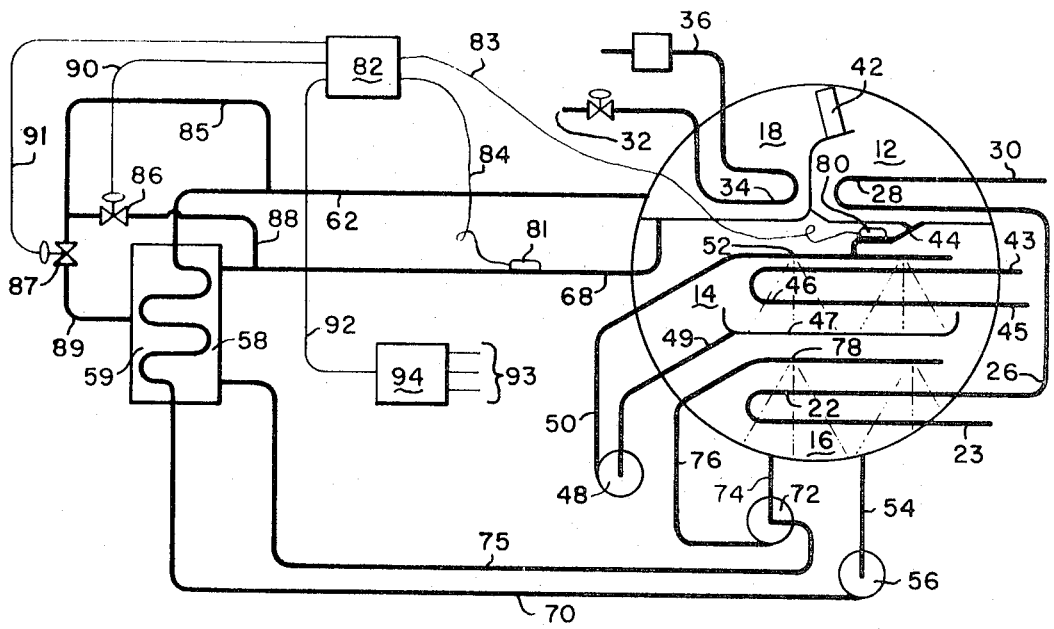
FIG. 1 is a schematic illustration of an absorption refrigeration machine employing an embodiment of the invention. It illustrates a differential temperature control for dumping dilute solution into the solution heat exchanger.

Referring to FIG. 1, an absorption machine, enclosed by fluid tight shell 10, contains a condenser 12, an evaporator 14, an absorber 16, and a generator 18. The absorber 16 contains a heat exchanger 22 supplied with cooling fluid through a conduit 23 from a cooling tower (not shown) to remove heat from the absorber and condenser. This cooling fluid is conducted by a conduit 26 to heat exchanger 28 in condenser 12. The cooling fluid leaves the condenser through a conduit 30 and is returned to a cooling tower or other suitable source for cooling fluid.

Various types of refrigerants and absorbents may be used in the present machine. A solution of lithium bromide absorbent in a refrigerant such as water is satisfactory. The term "concentrated solution" as used herein means a solution which is concentrated in absorbent. A "dilute solution" is one which is dilute in absorbent.

Steam flows from a source 32, such as a boiler, to a heat exchanger 34 in generator 18. Heat exchanger 34 is adapted to return steam condensate to the source of steam via conduit 36. It is, of course, understood that other suitable sources of heat can be used to concentrate absorbent solution in the generator 18. Heat from condensing steam in the heat exchanger 34 causes dilute solution in the generator to boil, thus producing refrigerant vapor and concentrating the absorbent solution.

The refrigerant vapor generated in the generator 18 flows through a liquid eliminator 42 into the condenser 12, in which the refrigerant is condensed to a liquid by heat exchange with the cooling fluid in heat exchanger 28. The liquid refrigerant flows from the condenser through conduit 44 and through spray headers 52 into the evaporator 14.

A refrigerant liquid is vaporized in evaporator 14, thus removing heat from a chilled fluid being circulated through heat exchanger 46. The chilled fluid enters shell 10 through a conduit 43 and leaves through conduit 45. This chilled fluid is circulated to a heat load.

Since absorber section 16 is in vapor communication with the evaporator 14, the absorbent solution can absorb refrigerant vapor from the evaporator, and thus remove heat from the evaporator section. Refrigerant liquid dropping from the heat exchanger 46 is collected by pan 47. It flows from the pan through a conduit 49 to a pump 48 which delivers the refrigerant liquid through a conduit 50 to be sprayed in evaporator 14 through nozzles 52.

Dilute solution from the absorber 16 flows through conduit 54, pump 56 and heat exchanger 58, in conduit 62 to the generator 18 in which it is concentrated. The concentrated solution from the generator 18 flows through conduit 68 into the heat exchanger 58, in which it transfers heat to the weak solution flowing from conduit 54. From the heat exchanger 58 the concentrated solution flows through a conduit 70 to pump 72, at which point it mixes with dilute solution flowing from the absorber 16 through conduit 74. The mixed solution is forced by pump 72 through conduit 76 and is discharged into the absorber 16 through spray nozzles 78. It is to be understood that all pumps are driven by suitable motors which, for simplicity, have not been shown.

A temperature sensing element 80 is positioned on or in conduit 44 to sense the temperature of liquid refrigerant leaving the condenser. The temperature of the refrigerant at this point is representative of the condensing temperature within the condenser itself. A second temperature sensing element 81 is placed in or on concentrated solution conduit 68 near its outlet from generator 18. Element 81 senses the temperature of concentrated solution leaving the generator. Control 82 is responsive to the temperature sensed by elements 80 and 81 via lines 83 and 84. Control 82 measures the difference between the leaving temperature of concentrated solution and the condensing temperature. When this difference exceeds a predetermined maximum, for example, 105° F. for an average absorption refrigeration machine, a signal is generated and transmitted through one or more of the output control lines.

In this embodiment of the invention a conduit 85 is placed in fluid communication with conduit 62 and with either or both of normally closed valves 86 and 87. The downstream side of valve 86 is placed in fluid communication with conduit 68 via conduit 88. The downstream side of valve 87 is placed in fluid communication with the concentrated solution flow passage 59 of heat exchanger 58 via conduit 89. Either or both of normally closed valves 86 and 87 can be used in conjunction with this anticrystallization control. Whether the dilute solution from conduit 85 is dumped into conduit 68 or into flow passage 59 or both is a matter of economics and the particular design of a given absorption machine.

When control 82 generates a signal it is transmitted through either or both of control lines 90 and 91 depending upon which variation is utilized. A signal in control line 90 will cause valve 86 to open, thus dumping the solution through conduit 88 into conduit 68. The flow of solution into conduit 68 will eventually reach heat exchange passage 59, diluting concentrated solution therein. When the decrystallization is complete, normal flow through heat exchange passage 59 can resume. When a signal is transmitted through control line 91, valve 87 is signaled to open. Dilute solution from conduit 85 will be dumped through conduit 89 into heat exchange passage 59, thus effecting decrystallization thereof.

As normal flow is again resumed through conduits 68 flow passage 59 and conduit 70 the difference in temperatures at 80 and 81 will drop below the aforementioned predetermined maximum to a normal operating difference.

When the temperature difference drops below the predetermined maximum, an additional control signal can be generated by control 82 and transmitted through control line 92. A second control means 94 is responsive to the presence of a signal in line 92. Control 94 causes appropriate signals to be generated and transmitted through control line 93 to effect a predetermined sequential dilution and shutdown cycle of the absorption machine. Such a dilution cycle will normally shut off the flow of heated fluid to heat exchanger 34 and the flow of cooling fluid to heat exchanger 22 and 28. Pumps 48, 72 and 56 will continue to operate until the concentrations of solution in the generator 18 and the absorber 16 have equalized. At this point the entire machine will automatically cease operation.

In addition a conventional alarm means can be utilized. Such an alarm means, for example an alarm bell or light, can be actuated by control 82 when the temperatures at 80 and 81 exceed a predetermined maximum.

Figure 2:
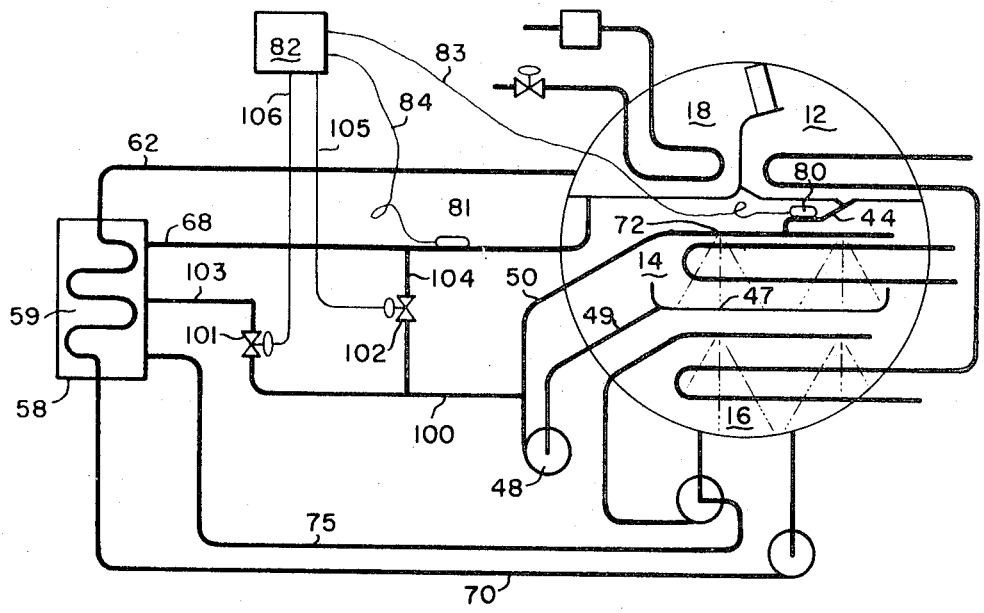
FIG. 2 is a schematic illustration of an absorption refrigeration machine employing the preferred embodiment of the invention. It illustrates a differential temperature control for dumping refrigerant into the solution heat exchanger.

FIG. 2 illustrates the preferred form of the present invention. In this embodiment refrigerant from the evaporator 14 is utilized to dilute and decrystallize conduit 68 and heat exchange passage 59. A conduit 100 places refrigerant recirculation conduit 50 in fluid communication with valves 101 and 102. The downstream side of valve 101 is placed in fluid communication with heat exchange passage 59 via conduit 103. The downstream side of valve 102 is placed in fluid communication with concentrated solution conduit 68 via conduit 104. Either or both of valves 101 and 102 can be utilized or activated to prevent blockage of heat exchange passage 59. The choice of valves and flow passages is again dependent upon economics and the particular design of a given absorption refrigeration machine.

When the temperatures at sensors 80 and 81 exceed a predetermined maximum, control 82 generates a signal and transmits the signal through control lines 105 and 106. The signal in line 105 will cause normally closed valve 102 to open and dump refrigerant from evaporator pan 47 into concentrated solution conduit 68. Likewise the signal in control line 106 will signal normally closed valve 101 to open and will dump refrigerant into heat exchange passage 59. Thus the partially crystallized concentrated solution in conduit 68 and flow passage 59 is diluted. When normal flow has resumed through heat exchange passage 59, due to complete decrystallization, the difference between temperatures 80 and 81 will drop back to a normal differential below the aforementioned predetermined maximum. A control, similar to control 94, FIG. 1, can also be used with this embodiment of the present invention to effect a dilution or shutdown cycle.

The control components utilized with the invention described above are of conventional manufacture. They can be, for example, electro-mechanically or pneumatically actuated.

Although the decrystallization control of this invention has been explained in conjunction with a single stage generator absorption refrigeration machine, it can also be utilized with a two stage generator absorption machine. In the two stage machine crystallization will occur in the concentrated solution passages of the low temperature heat exchanger. The low temperature heat exchanger is one which is situated between the second stage low pressure generator and the absorber. It exchanges heat between the concentrated solution flowing to the absorber and the dilute solution flowing from the absorber. The temperatures sensed would be those of the refrigerant leaving the second stage condenser and the concentrated solution leaving the second stage generator.

An example of such a low temperature heat exchanger is illustrated in the drawing of U.S. Pat. 3,287,928, reference numeral 26. The fluid and control circuitry can easily be adapted by one of ordinary skill in the art from the preceding disclosure to an absorption refrigeration machine having a two stage generator and high and low temperature heat exchangers.

Therefore, what is claimed is:

1. An absorption refrigeration machine including an absorber, an evaporator, a condenser, a generator means for producing concentrated solution, first conduit means for conducting concentrated solution from said generator means to said absorber, second conduit means for conducting dilute solution from said absorber to said generator means, and a heat exchange means for placing said second conduit means in heat exchange relationship with said first conduit means at a point between said generator means and said absorber, said heat exchange means having a first flow passage comprising a portion of said first conduit means and a second flow passage comprising a portion of said second conduit means, said heat exchange means positioned below said generator means, the improvement comprising:

control means for sensing the difference between a temperature representative of the operating temperature of said condenser and the temperature of concentrated solution leaving said generator means, and for producing a control signal when said difference exceeds a predetermined maximum, anticrystallization means responsive to said control signal for diluting the concentrated solution in said first flow passage by directly admixing liquid refrigerant therewith.

2. The machine of claim 1 including a first heat exchanger in said evaporator, a collection pan positioned below said heat exchanger, first circuit means including said pan for recirculating refrigerant from said collection pan for distribution onto said first heat exchanger, wherein said anticrystallization means comprises:

fifth conduit means placing said first circuit means in fluid communication with said first flow passage, third valve means for controlling flow in said fifth conduit means responsive to said control signal, said third valve means normally closed to flow.

3. The machine of claim 1 including a first heat exchanger in said evaporator, a collection pan positioned below said heat exchanger, first circuit means including said pan for recirculating refrigerant from said collection pan for distribution onto said first heat exchanger, wherein said anticrystallization means comprises:

sixth conduit means placing said first circuit means in fluid communication with said first conduit means between said heat exchange means and said generator means, fourth valve means for controlling flow in said sixth conduit means responsive to said control signal, said fourth valve means normally closed to flow.

References Cited

UNITED STATES PATENTS

| 3,452,552 | 7/1969 | Johnson | 62—141 |
| 3,054,272 | 9/1962 | Leonard, Jr. | 62—141 X |
| 3,279,206 | 10/1966 | Leonard, Jr. | 62—141 |

MEYER PERLIN, Primary Examiner

P. D. FERGUSON, Assistant Examiner

U.S. Cl. X.R.

62—476